US012567809B2

(12) United States Patent
Knoll

(10) Patent No.: US 12,567,809 B2
(45) Date of Patent: Mar. 3, 2026

(54) DC-TO-DC CONVERTER FOR A WELDING DEVICE AND METHOD FOR OPERATING A DC-TO-DC CONVERTER OF A WELDING DEVICE

(71) Applicant: Fronius International GmbH, Pettenbach (AT)

(72) Inventor: Thomas Knoll, Wels-Thalheim (AT)

(73) Assignee: Fronius International GmbH, Pettenbach (AT)

( * ) Notice: Subject to any disclaimer, the term of this patent is extended or adjusted under 35 U.S.C. 154(b) by 776 days.

(21) Appl. No.: 17/915,723

(22) PCT Filed: Mar. 30, 2021

(86) PCT No.: PCT/EP2021/058312
§ 371 (c)(1),
(2) Date: Sep. 29, 2022

(87) PCT Pub. No.: WO2021/198265
PCT Pub. Date: Oct. 7, 2021

(65) Prior Publication Data
US 2023/0125970 A1 Apr. 27, 2023

(30) Foreign Application Priority Data

Mar. 31, 2020 (EP) .................................... 20167100

(51) Int. Cl.
*H02M 3/156* (2006.01)
*B23K 9/10* (2006.01)
(Continued)

(52) U.S. Cl.
CPC ......... *H02M 3/1584* (2013.01); *B23K 9/1043* (2013.01); *H02M 1/0054* (2021.05);
(Continued)

(58) Field of Classification Search
CPC ...... H02M 3/1584; B23K 9/1043; B23K 9/10
See application file for complete search history.

(56) References Cited

U.S. PATENT DOCUMENTS 3,737,755 A * 6/1973 Calkin .............. H02M 7/53871
363/17
4,295,188 A 10/1981 Brunssen
(Continued)

FOREIGN PATENT DOCUMENTS

EP 2 866 341 4/2015
EP 3 043 461 7/2016
(Continued)

OTHER PUBLICATIONS

Int'l Search Report (Form PCT/ISA/210) conducted in Int'l Appln. No. PCT/EP2021/058312 (Jun. 21, 2021).
(Continued)

*Primary Examiner* — Woody A Lee, Jr.
(74) *Attorney, Agent, or Firm* — GREENBLUM & BERNSTEIN, P.L.C.

(57) ABSTRACT

To reduce energy losses for a welding device when on stand-by and to enable a clean and controlled start of the welding phase, a DC-to-DC converter of the welding device converts an input DC voltage present at an input connection to an output DC voltage present at an output connection. At least one switch element of a branch of the DC-to-DC converter is switched with a switching frequency, and a welding phase is provided for the welding device, during which the switching frequency corresponds to a normal switching frequency. A stand-by phase is provided for the welding device, during which the at least one switch element is switched with a switching frequency corresponding to a stand-by switching frequency which is lower than the normal switching frequency.

16 Claims, 5 Drawing Sheets

Figure 1:
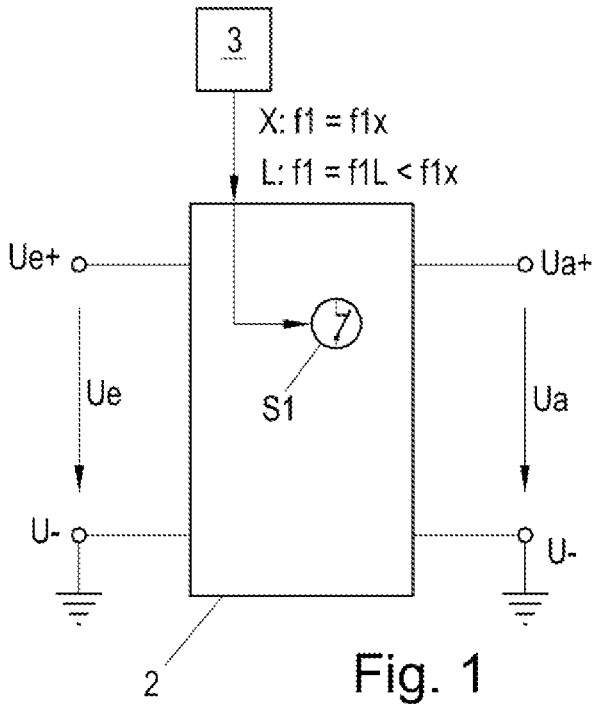

(51) Int. Cl.
  *H02M 1/00* (2006.01)
  *H02M 3/158* (2006.01)
(52) U.S. Cl.
  CPC .......... *H02M 1/007* (2021.05); *H02M 3/156* (2013.01); *H02M 3/1586* (2021.05); *H02M 1/0032* (2021.05)

(56) References Cited

U.S. PATENT DOCUMENTS

| | | | | |
|---|---|---|---|---|
| 8,269,141 B2 * | 9/2012 | Daniel | .................... | B23K 9/09 |
| | | | | 219/130.1 |
| 8,604,384 B2 * | 12/2013 | Madsen | .............. | B23K 9/1012 |
| | | | | 219/130.51 |
| 8,785,816 B2 * | 7/2014 | Kooken | .............. | B23K 9/1043 |
| | | | | 219/130.1 |
| 9,956,639 B2 * | 5/2018 | Kooken | .............. | B23K 9/1075 |
| 2007/0216388 A1 * | 9/2007 | Sohma | ................. | H02M 3/156 |
| | | | | 323/284 |
| 2015/0138842 A1 | 5/2015 | Knoll et al. | | |
| 2015/0229211 A1 | 8/2015 | Walsh et al. | | |
| 2015/0349633 A1 | 12/2015 | Li | | |
| 2017/0207710 A1 | 7/2017 | Kong et al. | | |

FOREIGN PATENT DOCUMENTS

| | | | | | |
|---|---|---|---|---|---|
| EP | 2850725 | | 9/2016 | | |
| JP | 2006271185 A | * | 10/2006 | ........... | H02M 3/158 |
| JP | 2013-215791 | | 10/2013 | | |
| JP | 2013215791 A | * | 10/2013 | | |
| JP | 2017-77582 | | 4/2017 | | |
| KR | 100842877 B1 | * | 7/2008 | .......... | B23K 37/006 |
| WO | 2013/170287 | | 11/2013 | | |

OTHER PUBLICATIONS

Int'l Written Opinion (Form PCT/ISA/237) conducted in Int'l Appln. No. PCT/EP2021/058312 (Jun. 21, 2021).
Int'l Prelim. Exam. Report (Form PCT/IPEA/409) conducted in Int'l Appln. No. PCT/EP2021/058312 (Jun. 22, 2022).
Japan Office Action conducted in counterpart Japan Appln. No. 2022-559612 (Dec. 6, 2023).
Japan Office Action conducted in counterpart Japan Appln. No. 2022-559612 (Jul. 18, 2023).

* cited by examiner

DC-TO-DC CONVERTER FOR A WELDING DEVICE AND METHOD FOR OPERATING A DC-TO-DC CONVERTER OF A WELDING DEVICE

The present invention relates to a method for operating a welding device, a DC-to-DC converter of the welding device converting an input DC voltage present at an input connection into an output DC voltage present at an output connection, at least one switch element of the DC-to-DC converter being switched with a switching frequency, a welding phase being provided for the welding device, during which the switching frequency corresponds to a normal switching frequency. Furthermore, the present invention relates to a DC-to-DC converter for a welding device, the DC-to-DC converter being designed to convert an input DC voltage present at an input connection into an output DC voltage present at an output connection, the DC-to-DC converter comprising at least one switch element in a branch and comprising a control unit, the control unit being designed to switch the switch element with a switching frequency corresponding to a normal switching frequency in a welding phase of the welding device. In addition, the present invention relates to a welding device comprising a DC-to-DC converter and a welding power unit, the welding power unit being designed to control the output DC voltage to a welding voltage in the welding phase.

DC-to-DC converters convert an input DC voltage at an input side into an output DC voltage at an output side. In the case of a boost converter, also called a step-up converter, the output DC voltage is greater than the input DC voltage, whereas in the case of a buck converter, also called a step-down converter, the output DC voltage is less than the input DC voltage. In the field of welding technology, especially boost converters are used.

For example, a boost converter is thus used as a DC-to-DC converter in a welding device, which boost converter converts an input DC voltage at an input side into a higher output DC voltage at an output side. During the welding operation, energy is transmitted from the input side to the output side during a welding phase, a welding phase beginning with an ignition of an arc. The output side of the DC-to-DC converter can be provided with a parallel intermediate circuit capacitor, whereby the output DC voltage is present at the intermediate circuit capacitor. In order to provide the welding operation with, among other things, sufficient welding voltage during the welding phase, a welding power unit is connected downstream of the output side of the DC-to-DC converter, i.e., the intermediate circuit capacitor. The welding power unit controls the output DC voltage to a suitable, preferably isolated, welding voltage and/or a welding current, it being possible for the welding voltage/the welding current to be output in a pulsed and/or continuous manner, depending on the desired welding operation. Such a welding device is disclosed, for example, in EP 2850725 B1.

During operation of a welding device, however, the welding phases are interrupted by stand-by phases in which no welding is carried out. During these stand-by phases, a small amount of energy is still transmitted from the DC-to-DC converter to the welding power unit connected to the output, for example in order to operate electronic control units, closed-loop control units, displays, etc., which are present in the welding device. Since there is no arc burning in the stand-by phase, the quantity of energy is smaller. However, the DC-to-DC converter is in operation both in the welding phases and in the stand-by phases of the welding device, significant energy losses of course occurring in the DC-to-DC converter even during stand-by phases.

It is therefore an object of the present invention to provide a DC-to-DC converter for a welding device which enables a clean and controlled start of the welding phase.

According to the invention, this object is achieved by a method in which a stand-by phase is provided for the welding device, during which the switch element is switched with a switching frequency corresponding to a stand-by switching frequency lower than the normal switching frequency. Furthermore, the object is achieved by a DC-to-DC converter, the control unit being designed to switch the switch element with a switching frequency corresponding to a stand-by switching frequency lower than the normal switching frequency in a stand-by phase of the welding device. In addition, the object is achieved by a welding device comprising a DC-to-DC converter according to the invention and a welding power unit, the welding power unit being designed to control the output DC voltage to a welding voltage in the welding phase. During the welding phase, energy is transmitted from the input of the DC-to-DC converter to the output of the DC-to-DC converter. The control to the welding voltage is of course only exemplary; of course, the output DC voltage can be controlled such that a welding current is established or that both a welding voltage and a welding current are established. In this context, reference is made to constant voltage control/constant current control.

Since the switch element of the DC-to-DC converter is not deactivated in a stand-by phase of the welding device, but only the switching frequency of the switch element is reduced to the stand-by switching frequency, the desired output DC voltage for the welding phase is maintained at the output connection during the stand-by phase of the welding device. This output DC voltage is sufficient for the operation of the welding device in the stand-by phase (for example, a supply to electronic control units, closed-loop control units, displays, etc.). In contrast to a continuous operation of the switch element with the normal switching frequency (even during the stand-by phase), energy losses during the stand-by phase are significantly reduced when the stand-by switching frequency is used in the stand-by phase.

Furthermore, the output DC voltage present at a required level at the output connection also during the stand-by phase ensures that a controlled and clean start of the welding operation is already ensured directly at the start of the welding phase.

In the welding phase, the output DC voltage is preferably controlled to a welding voltage by a welding power unit, a load being supplied with the welding voltage.

Preferably, the branch comprises an inductor and a freewheeling diode, a first coil terminal of the inductor being connected to the input connection and a second coil terminal of the inductor being connected to a first switch terminal of the switch element and to an anode of the freewheeling diode, a second switch terminal of the switch element being connected to ground and a cathode of the freewheeling diode being connected to the output connection.

This arrangement describes a boost converter, it also being possible for the invention to be applied to further embodiments of boost converters. Of course, it is also conceivable for the method according to the invention to be applied to another type of DC-to-DC converter (buck converter, buck-boost converter, etc.).

Preferably, at least one further switch element of at least one further branch of the DC-to-DC converter is switched with at least one further switching frequency, the at least one further switching frequency corresponding to a further normal switching frequency in the welding phase. The method according to the invention can thus also be applied to DC-to-DC converters having a plurality of switch elements.

The DC-to-DC converter can comprise at least one further branch having at least one further switch element, at least one further inductor and at least one further freewheeling diode, a first coil terminal of the at least one further inductor in each case being connected to the input voltage in the at least one further branch, and a second coil terminal of the at least one further inductor in each case being connected to a first switch terminal of the at least one further switch element and to an anode of the at least one further freewheeling diode, a second switch terminal of the at least one further switch element being connected to ground, and a cathode of the at least one freewheeling diode being connected to the output connection in each case, the control unit being designed to switch the at least one further switch element with at least one further switching frequency corresponding a further normal switching frequency during the welding phase of the welding device.

This describes a multi-branch boost converter, with multi-branch boost converters of different designs, buck converters or in general DC-to-DC converters, which comprise a control unit according to the invention, of course also being conceivable.

The one further normal switching frequency can correspond to the normal switching frequency. In this way, a particularly simple control of the switch elements by the control unit is possible in the welding phase. It is particularly advantageous if the switch elements of the branches are switched in a phase-shifted manner. Thus, in the case of a converter having n branches, the i-th branch (where 1<is n) is switched on with a time shift of $(T^*(1\text{-}1)/n$ period duration relative to the first branch, where T corresponds to the period duration. This method is known as an "interleaved operating mode."

Preferably, in the stand-by phase, the at least one further switching frequency is switched with a further stand-by switching frequency lower than the further normal switching frequency.

Accordingly, the control unit can be designed to switch the at least one further switch element with a further stand-by switching frequency lower than the further normal switching frequency in the stand-by phase.

If the DC-to-DC converter has at least one further switch element, a number of these switch elements, preferably all of the switch elements, can in each case be switched with a stand-by switching frequency lower than the further normal switching frequency in order to further reduce the stand-by power loss.

The at least one further stand-by switching frequency can correspond to the stand-by switching frequency, whereby a particularly simple control of the switch elements by the control unit is possible in the stand-by phase.

The at least one further switch element is preferably deactivated in the stand-by phase. The control unit can correspondingly be designed to deactivate the at least one further switch element in the stand-by phase.

If a plurality of switch elements is present, a plurality of switch elements, preferably all of the switch elements except one, can thus also be deactivated in order to achieve a maximum reduction of the stand-by power losses in the stand-by phase. Meanwhile, at least one switch element is operated with the stand-by switching frequency in order to prevent a decrease of the output DC voltage during the stand-by phase and to enable a rapid start of the welding process even at the beginning of the welding phase. It was possible to measure reductions in the stand-by power loss from 43 W to 2 W when three branches each having a switch element were provided in the DC voltage converter, a first switch element of the first branch being operated with a stand-by switching frequency of 2 kHz and the remaining switch elements of the second and third branches being deactivated in the stand-by phase of the welding device.

A control signal, preferably transmitted via an interface, e.g., an RS-485 bus, can cause a switchover of the DC-to-DC converter from the welding phase to the stand-by phase and/or from the stand-by phase to the welding phase.

The control signal can be made by actuating a switch/pushbutton, for example arranged on the torch of the welding device, at the intended start or end of the welding. The control signal can also be triggered in another way in order to announce the start or stop of the welding phase.

Furthermore, a parameter defined in the welding device can cause a switchover from the welding phase to the stand-by phase and/or from the stand-by phase to the welding phase. Of course, the control signal can also be triggered by the parameter.

For example, a specific, e.g., changed, that is to say, reduced or increased, welding voltage and/or a specific, e.g. reduced/increased, current flow on the output side can be used as the parameter. As a result, a need to switch into or out of the stand-by phase can be detected. An event-controlled switchover into or out of the stand-by phase can also take place, it being possible for a short circuit during the welding operation to be regarded as an event, for example.

The parameter can be detected and/or processed by a closed-loop controller or an open-loop controller of the welding device, for example.

Figure 2:
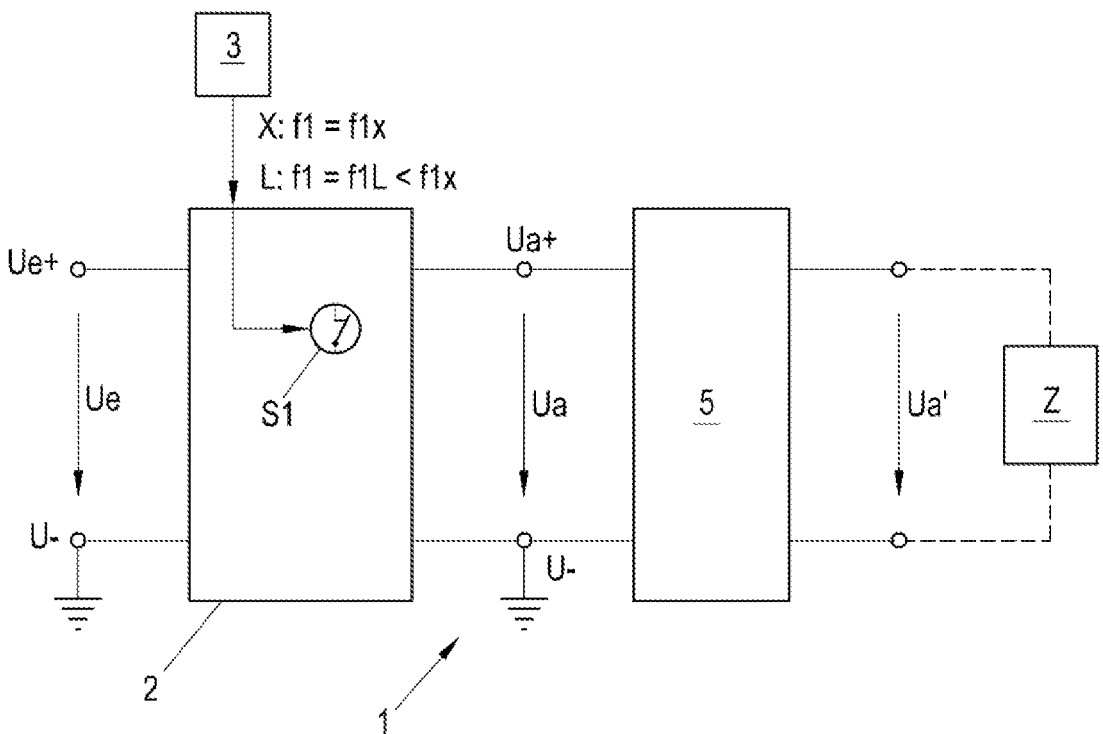
Figures 3, 4:
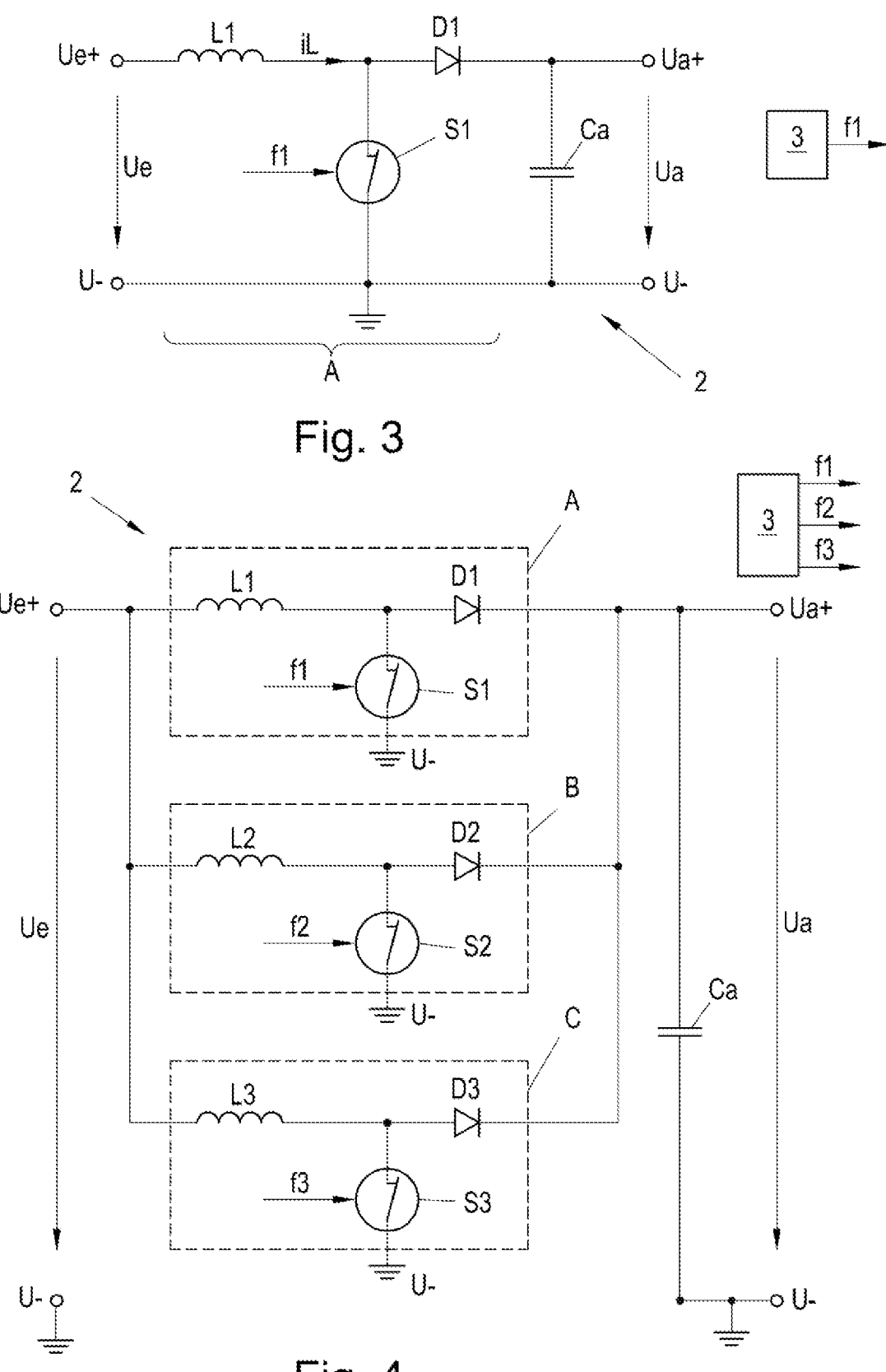
Figure 5:
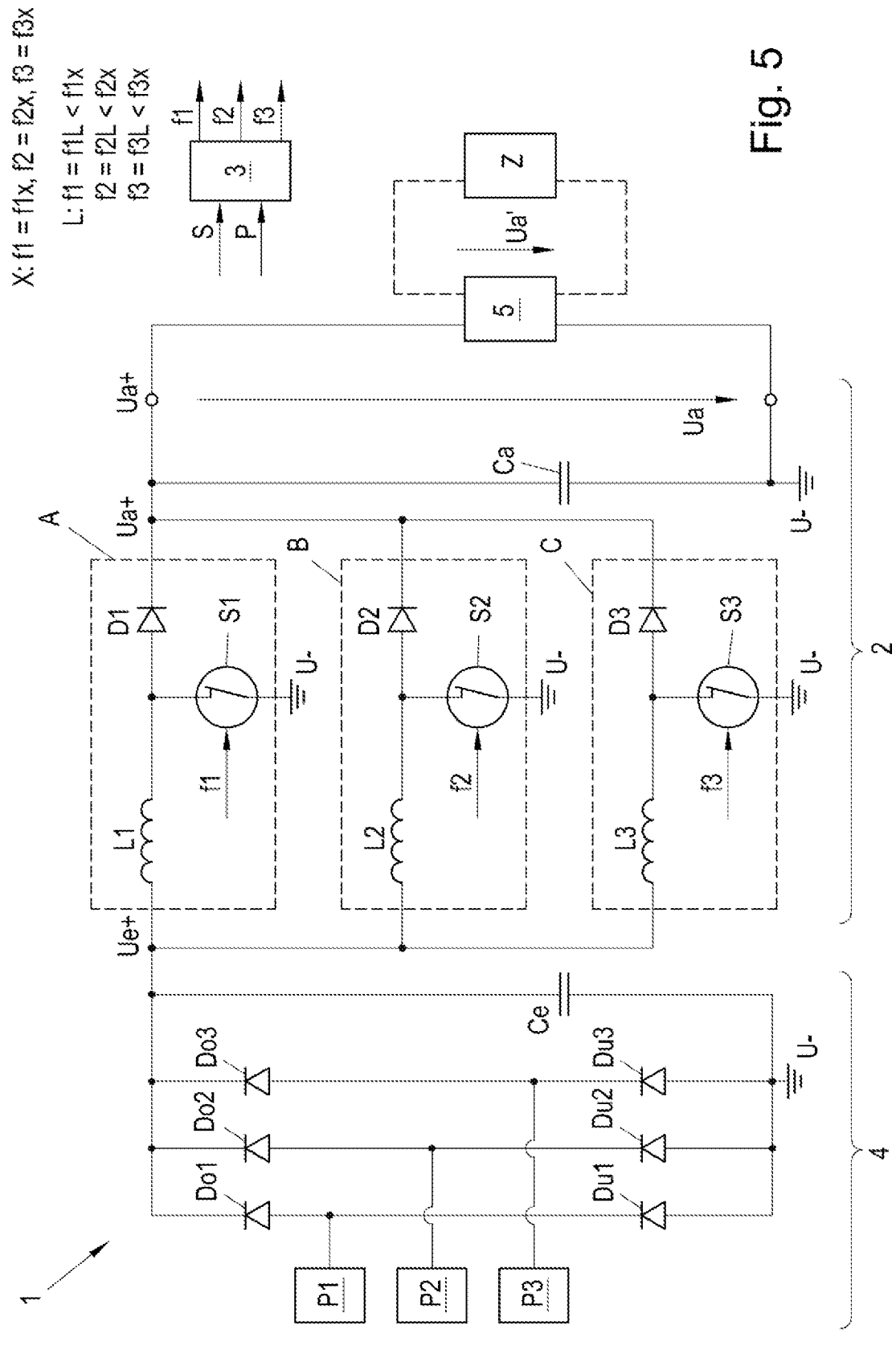
Figure 6:
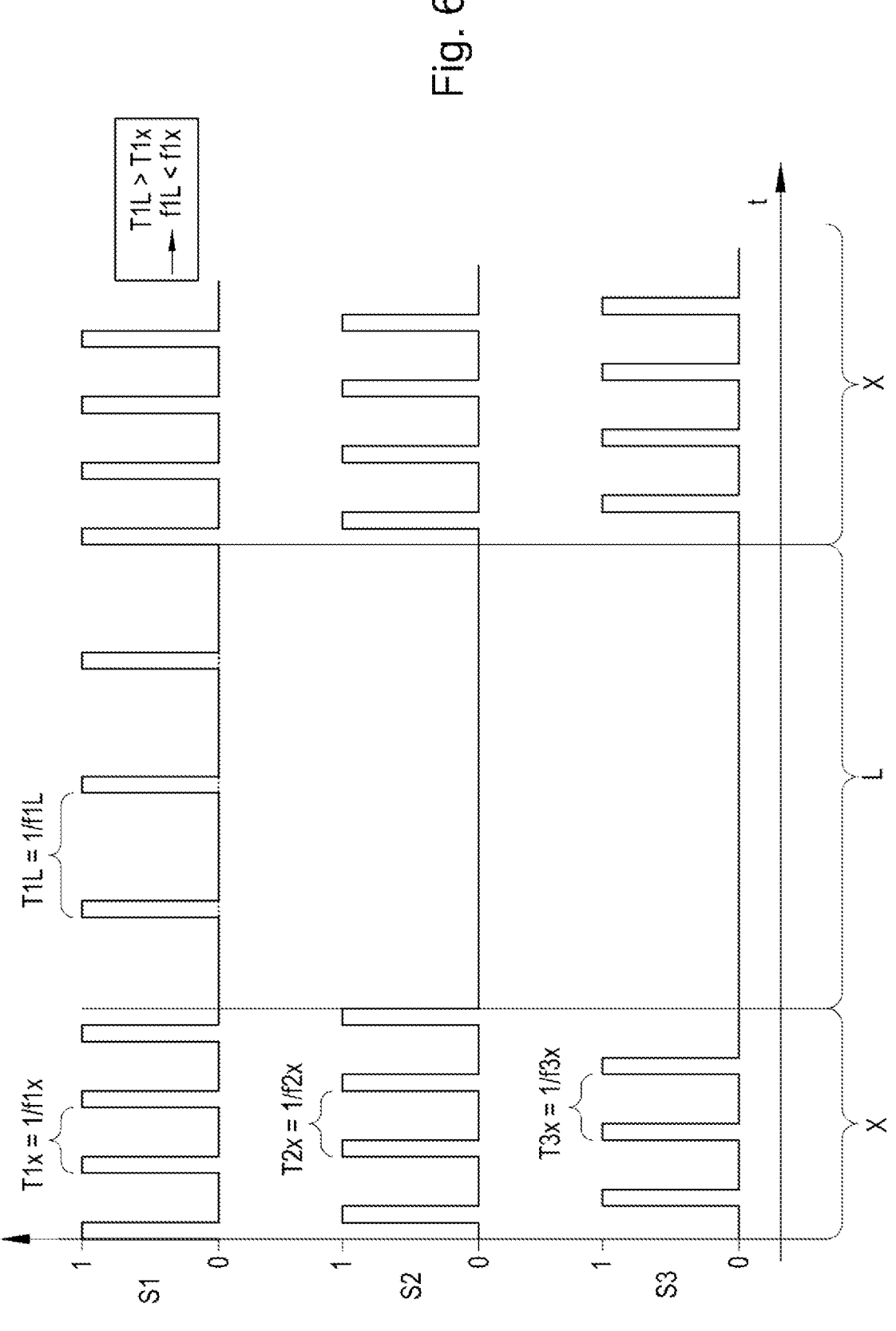
Figure 7:
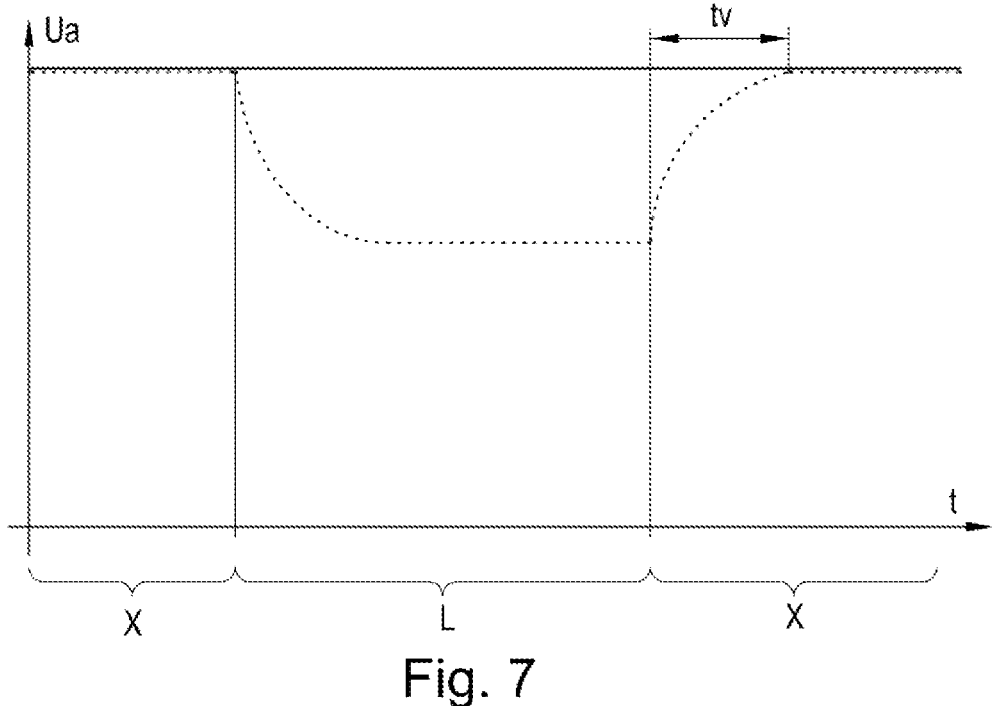

In the following, the present invention is described in greater detail with reference to FIGS. 1 to 7, which, by way of example, show schematic and non-limiting advantageous embodiments of the invention. In the drawings:

FIG. 1 shows a DC-to-DC converter,

FIG. 2 shows a welding device having a DC-to-DC converter and a welding power unit, FIG. 3 shows a single-branch boost converter as a DC-to-DC converter, FIG. 4 shows a multi-branch boost converter as a DC-to-DC converter, FIG. 5 shows a welding device having a rectifier, a multiphase boost converter and a welding power unit, FIG. 6 shows a profile of the switching states of the switch elements, FIG. 7 shows a profile of the output DC voltage.

FIG. 1 shows a schematic DC-to-DC converter 2. A DC-to-DC converter 2 converts an input DC voltage Ue into an output DC voltage Ua, the input DC voltage Ue being present at an input connection Ue+ and the output DC voltage Ua being present at an output connection Ua+. More precisely, the input DC voltage Ue is present between the input connection Ue+ and a ground U-, and the output DC voltage Ua is present between the output connection Ue— and a ground U-. Usually, a common ground U—is used in the DC-to-DC converter 2 but it is also possible, for example, to use different grounds U—by using a corresponding circuit topology for the input side and the output side, which can be realized by means of potential isolation, for example via a transformer.

A DC-to-DC converter 2 can be used in a welding device 1, as is shown schematically in FIG. 2. An output DC voltage Ua at the output connection Ua+is generated by the DC-to-DC converter 2. The welding device 1 further comprises a welding power unit 5 having a power unit input and a power unit output. In a welding phase X, the welding power unit controls the output DC voltage Ua present at the power unit input to a welding voltage Ua' present at the power unit output. The welding voltage Ua' can be continuous or pulsed. In the stand-by phase L, the output DC voltage Ua is present at the power unit input of the welding power unit 5. The control to the welding voltage Ua' is indicated here only by way of example. Likewise, control to a welding current or alternately to a welding current and to the welding voltage is possible. The control is correspondingly adapted to the welding operation.

During the welding phase X, the DC-to-DC converter 2 is operated by a control unit 3, which can be analog or digital, with a switching frequency f1 corresponding to a normal switching frequency f1x. This means that a switch element S1 of the DC-to-DC converter 2 is switched with a switching frequency f1. According to the invention, the switching frequency f1 is divided, depending on the phase, into a normal switching frequency f1x, which corresponds to the switching frequency f1, and a stand-by switching frequency f1L and correspondingly switched over.

After the welding phase X, the welding device 1 is switched into a stand-by phase L. According to the prior art, during this stand-by phase L the DC-to-DC converter 2 continues to be operated with the normal switching frequency f1x and with the corresponding losses. In contrast, according to the invention, in the stand-by phase L of the welding device 1 the DC-to-DC converter 2 is, however, operated with a stand-by switching frequency f1L lower than the normal switching frequency f1x. Losses are thus kept at a minimum and the output DC voltage Ua does not decrease in the stand-by phase L. It is thus achieved that, after the end of the stand-by phase L and at the beginning of the welding phase X, the welding process can actually be started immediately.

In the welding phase X, a load Z (drawn in dashed lines in FIG. 2)—in the case of a welding operation, an arc—is connected to the output connection Ua+ or to the power unit output of the welding power unit 5, whereby energy is transmitted from the input side to the output side. During the welding phase X, an arc burns, which is ignited at least at the beginning of the welding phase X. In the stand-by phase L, the load is not connected to the output connection Ua+ or to the welding power unit 5, whereby no energy is output on the output side and no arc burns.

During the stand-by phase L, according to the invention, lower switching losses occur than in the welding phase X, since the switch element S1 switches less frequently due to the lower stand-by switching frequency f1L. A sufficiently high output DC voltage Ua is further provided to the welding device 1 by the DC-to-DC converter 2 in order to supply electronic control units, closed-loop control units, displays, etc. that are present in the welding device 1.

FIG. 3 shows a simple, single-branch boost converter as a DC-to-DC converter 2. The boost converter comprises a single branch A having an inductor L1, a freewheeling diode D1 and a switch element S1. The inductor L1 and the freewheeling diode D1 are connected in series. A first coil terminal of the inductor L1 is connected to the input connection Ue+ and a second coil terminal of the inductor L1 is connected in series with an anode of the freewheeling diode D1. A cathode of the freewheeling diode D1 is connected to the output connection Ua+. At its output connection Ua+, the DC-to-DC converter 2 is further connected to a first capacitor terminal of an intermediate circuit capacitor Ca; the second capacitor terminal of the intermediate circuit capacitor Ca is connected to ground U-. The output DC voltage Ua is present at the intermediate circuit capacitor Ca.

The second coil terminal of the inductor L1. (and thus also the anode of the freewheeling diode D1) is thus connected to ground U-via the switch element S1 (e.g. a MOSFET, GTO thyristor, bipolar transistor, etc.). The switch element S1 is opened and closed with a switching frequency f1, a control unit 3 being provided for controlling the switching frequency f1. Typical switching frequencies f1 are 20 kHz to 150 kHz, higher switching frequencies f1 also being conceivable, in particular using advanced semiconductor technologies. The duty cycle of the switch element S1 is, for example, 0 to 95%.

The anode of the freewheeling diode D1 is thus connected to ground U—in the case of a closed switch element S1, and disconnected from ground U—in the case of an open switch element S1.

If the switch element S1 is closed (conducting phase), the second coil terminal of the inductor L1 is connected to ground U-, whereby the input voltage Ue is present at the inductor L1. As a result, a coil current iL, which increases from the initial point in time of the closing of the switch element S1, flows via the inductor L. Due to the coil current iL, energy is (temporarily) stored in the inductor L. Since the anode of the freewheeling diode D1 is likewise connected to ground U—by the closed switch element S1, the freewheeling diode D1 blocks.

If the switch element S1 is then opened (blocking phase), the coil current iL will be maintained by the inductor L1. The potential at the second connection of the inductor L1 and thus also at the anode of the freewheeling diode D1 increases. As soon as the potential at the anode of the freewheeling diode D1 exceeds the voltage at the cathode of the freewheeling diode D1 by more than the threshold voltage of the freewheeling diode D1, the freewheeling diode D1 becomes conductive. The coil current iL flows via the freewheeling diode D1 and the intermediate circuit capacitor Ca to ground U-, whereby the intermediate circuit capacitor Ca is charged. At the same time, at least portions of the energy stored in the magnetic field of the inductor L1 and supplied via the input DC voltage Ue are transmitted to the intermediate circuit capacitor Ca. The intermediate circuit capacitor Ca is therefore charged, while the current in the inductor L1 decreases, the output DC voltage Ua being present at the intermediate circuit capacitor Ca.

If the switch element S1 is once again closed (conducting phase) after a blocking phase, the output DC voltage Ua present at the intermediate circuit capacitor Ca will first be maintained at its value by the intermediate circuit capacitor Ca. During the conducting phase, there is no direct flow of energy from the input side to the output side, but the inductor L is recharged.

During the welding phase X, the switch element S1 is switched by a control unit 3 with a switching frequency f1 corresponding to a normal switching frequency f1x. This normal switching frequency f1x and the associated duty cycle are to be configured in such a way as to prevent a decrease of the output DC voltage Ua during the conducting phases of the switch element S1.

According to the invention, in the stand-by phase L, the switch element is switched with a switching frequency f1 corresponding to a stand-by switching frequency f1L lower than the normal switching frequency f1x. The control unit 3 preferably handles this switching. Losses are thus significantly reduced and the output DC voltage Ua is prevented from decreasing to a lower value during the stand-by phase L in order to ensure that after the end of the stand-by phase L and the beginning of the welding phase X, the welding operation can be started immediately. For this purpose, the stand-by switching frequency f1L and the associated duty cycle are also to be configured accordingly in order to also prevent a decrease in the output DC voltage Ua during the conducting phases of the switch element S1 in the stand-by phase L.

FIG. 4 shows a multi-branch boost converter as a DC-to-DC converter 2. The structure is identical to the DC-to-DC converter 2 shown in FIG. 3, except that not only one branch A but at least one further branch B, C is provided. In other words, a plurality of parallel branches A, B, C are provided overall, in this case three branches A, B, C—that is to say two further branches B. C. Each branch A. B, C comprises an inductor L1, L2, L3, a switch element S1, S2, S3 and a freewheeling diode D1, D2, D3, which are connected in the relevant branch A, B, C analogously to the single-branch DC-to-DC converter 2 described above. The first coil terminals of the inductors L1, L2, L3 are connected together to the input connection Ue+, and the cathodes of the freewheeling diodes D1 are connected together to the first capacitor terminal of the intermediate circuit capacitor Ca and thus to the output connection Ua+. A separate intermediate circuit capacitor Ca (not shown) can also be provided for each branch A, B, C, these intermediate circuit capacitors Ca being connected in parallel with one another.

The second connections of the switch elements S1, S2, S3 are each connected to ground U- and are each controlled, i.e., closed and opened, by the control unit 3 with a switching frequency f1, f2, f3.

A control unit 3 is provided for controlling the switching frequencies f1, f2, f3. As a result of the embodiment in a plurality of branches A, B, C, a higher power can be generated on the output side than if a branch A, B, C (with the same dimensions) were active alone, but a higher stand-by power loss is also produced in the stand-by phase L due to the switching losses of the higher number of switch elements S1, S2, S3 and inductors L1, L2, L3 in this case.

In the welding phase X, the further switch elements S2, S3 are each switched with a further switching frequency f2, f3 corresponding to a normal switching frequency f2x, f3x, it being possible for the normal switching frequencies f2x, f3x to correspond to the normal switching frequency f1x.

According to the invention, in the stand-by phase L, the further switch elements S2, S3 are each switched with a further switching frequency f2, f3 corresponding to a further stand-by switching frequency f2L, f3L lower than the further normal switching frequency f2x, f3x. The further stand-by switching frequencies f2L, f3L can correspond to the stand-by switching frequency f1L. In the stand-by phase L, one or more of the further switch elements S2, S3 can also be deactivated. Meanwhile, however, at least one switch element S1 switches with the stand-by switching frequency f1L.

The further switch elements S2, S3 can also be switched in each case with a further stand-by switching frequency f2L, f3L as a further switching frequency f2, f3, the further stand-by switching frequencies f2L, f3L in each case being lower than the normal switching frequency f2x, f3x, as a result of which lower switching losses also occur for the further switch elements S2, S3, since these likewise switch less frequently than in the welding phase X.

In the stand-by phase L, all switch elements S1, S2, S3 are switched with stand-by circuit frequencies f1L, f2L, f3L lower than the relevant normal switching frequency f1x. f2x, f3x, the stand-by switching frequencies f1, f2L, f3L preferably being identical.

However, it is particularly advantageous if, during the stand-by phase L. a switch element S1 of a branch A is switched with the stand-by switching frequency f1L lower than the normal switching frequency f1x, and the further switch elements S2, S3 of the further branches B, C are deactivated (blocking phase), which means the further switch elements S2, S3 are permanently open. Particularly low stand-by power losses can thus be achieved.

FIG. 5 schematically illustrates a welding device 1 which, by way of example, comprises a multi-branch boost converter as a DC-to-DC converter 2. Of course, welding devices 1 having single-branch boost converters or single-branch buck converters or multi-branch buck converters are also conceivable. The number of branches A, B, C is also only three by way of example, but any number of branches A, B, C is conceivable. In principle, other topologies can also be used for the DC-to-DC converter 2.

The welding device 1 further comprises a rectifier stage 4 on the input side. The rectifier stage 4 is connected to the three network phases P1, P2, P3 of an AC network and comprises in each case a lower rectifier diode Du1, Du2, Du3 and an upper rectifier diode Do1, Do2, Do3 per network phase P1, P2, P3. Of course, the rectifier diodes Du1, Du2, Du3, Do1, Do2, Do3 can also be formed by switch elements. The anodes of the lower rectifier diodes Du1, Du2, Du3 are each connected to ground U- and the cathodes of the lower rectifier diodes Do1, Do2, Do3 are connected to the respective network phases P1, P2, P3. The anodes of the upper rectifier diodes Do1, Do2, Do3 are likewise connected to the relevant network phase P1, P2. P3 and the cathodes of the upper rectifier diodes Do1, Do2, Do3 are connected to the input connection Ue+ of the DC-to-DC converter 2. Furthermore, a smoothing capacitor Ce is provided in the rectifier stage 4, which capacitor Ce connects the cathodes of the upper rectifier diodes Do1, Do2, Do3 to the anodes of the lower rectifier diodes Du1, Du2, Du3. The mode of operation of a rectifier stage 4 is fundamentally known, which is why it will not be discussed in more detail here.

The rectifier stage 4 is to be regarded as optional. It is also possible to provide a welding device 1 which does not comprise a rectifier stage 4 and is operated, for example, in an interleaved mode.

The DC-to-DC converter 2 of the welding device 1 is operated as described with reference to FIGS. 3 and 4. A control unit 3 is provided for controlling the switching frequencies f1, f2, f3. In the welding phase X, the switching frequencies f1, f2, f3 correspond to the normal switching frequency f1x, f2x, f3x, for example 35 kHz. In the welding phase X of the welding device 1, a load Z (shown in dashed lines in FIG. 5) is connected to the output side of the DC-to-DC converter 2 via the welding power unit 5. In the stand-by phase L, no energy is delivered to the load Z on the output side.

In the stand-by phase L of the welding device 1, at least one switch element S1 is switched with a stand-by switching frequency f1L as the switching frequency f1, the stand-by switching frequency f1L being lower than the normal switching frequency f1x. The output DC voltage Ua at the intermediate circuit capacitor Ca is thus maintained in the stand-by phase L.

A control signal S, preferably transmitted via an interface, and/or a parameter P defined in the welding device 1 can bring about a switchover of the DC-to-DC converter 2 from the welding phase X into the stand-by phase L and/or from the stand-by phase L into the welding phase X. This can be done by supplying the control unit 3 with the control signal S and/or the parameter P. as indicated in FIG. 5.

FIG. 6 shows by way of example the switching patterns of the switch elements S1, S2. S3 of a three-branch DC-to-DC converter 2. The switch elements S1, S2, S3 are correspondingly controlled in a phase-shifted manner in the welding phase X. As can be seen, in the stand-by phase L, the switch element S1 is switched with a stand-by switching frequency f1L lower than the normal switching frequency f1x. Advantageously, the further switch elements S2, S3 are deactivated in the stand-by phase L (as shown).

According to the prior art, during the stand-by phase L all switch elements S1, S2, S3 continue to be operated with the normal switching frequency f1x, f2x, f3x, as a result of which energy losses occur.

In order to prevent energy losses during the stand-by phase L, the DC-to-DC converter 2 can also be deactivated, i.e. switched off, in the stand-by phase of the welding device. This is effected by the switch elements S1, S2, S3 no longer being controlled and thus remaining open. As a result, however, the output DC voltage Ua drops, since the intermediate circuit capacitor Ca discharges on the output side during the stand-by phase L and is no longer supplied with energy from the input side. This can lead to the situation in which too little voltage is available to the welding device 1 for operating the electronic control units, closed-loop control units, displays, etc., for which reason these have to be supplied with energy in some other way.

Furthermore, if the DC-to-DC converter 2 is deactivated during the stand-by phase L of the welding device 1, the problem may arise that, for a further welding phase of the welding device following the stand-by phase L, the DC-to-DC converter 2 must first return to a suitable operating state in order to be able to provide the energy or output DC voltage Ua required on the output side. Some time may pass until this suitable operating state is reached, with the result that a delay time tv of, for example, in the region of 50 ms can occur until the welding device 1 is ready for a further welding operation. Thus, upon deactivation of the switch elements S1, S2, S3 and thus of the DC-to-DC converter 2 in the stand-by phase L of the welding device 1, a further immediate start of the actual welding operation, i.e. an ignition of the arc, cannot take place in a controlled manner or at the intended time, so that the stable welding phase begins late or the arc does not ignite or ignites with difficulty. (The welding phase starts with the ignition of the arc). In FIG. 7 the output DC voltage Ua is shown in a dashed line for the case of a deactivation of all of the branches during the stand-by phase L. As can be seen, the output DC voltage Ua drops to the input DC voltage Ue during the stand-by phase L in the case of a boost converter. After switching back to the welding phase X, it takes a certain delay time tv, in this case 50 ms, until the output DC voltage Ua reaches its full value again, as a result of which the welding process can only start with a time delay.

In contrast, in FIG. 7 the output DC voltage Ua for switching one or more switch elements S1, S2, S3 according to the invention during the stand-by phase L is shown in an unbroken line. Since at least one switch element S1, S2, S3 continues to switch with a switching frequency f1L, f2L, f3L, the output DC voltage Ua is also maintained in the stand-by phase L. After the end of the stand-by phase L and the beginning of the welding phase X, the welding operation can thus be started immediately, since the DC-to-DC converter 2 continuously supplies the required output DC voltage Ua. The DC-to-DC converter 2 thus constantly provides the output DC voltage Ua required for an optimum start of the welding phase X to the welding power unit 5. Delays between the planned start of the welding process and an actual switchover of the DC-to-DC converter 2 into the welding phase X are prevented by the output DC voltage Ua which is already sufficiently high at the DC voltage output Ua+. The start of the welding process thus takes place immediately after the stand-by phase L at the beginning of the welding phase X. The losses of the DC-to-DC converter 2 are minimal in this case.

The invention claimed is:

1. A method for operating a welding device, which includes a DC-to-DC converter that converts an input DC voltage present at an input connection into an output DC voltage present at an output connection, and a welding power unit having a power unit input at which the output DC voltage is present, the method comprising:

switching at least one switch element of a branch of the DC-to-DC converter with a switching frequency corresponding to a normal switching frequency or to a stand-by switching frequency, wherein, in a welding phase, the switching frequency corresponds to the normal switching frequency, and in a stand-by phase, in which no arc burns, the switching frequency corresponds to the stand-by switching frequency, which is lower than the normal switching frequency, during the welding phase, controlling, with the welding power unit, the output DC voltage present at the power unit input to a welding voltage present at a power unit output in the welding phase, effecting a switchover from the welding phase into the stand-by phase and/or from the stand-by phase into the welding phase by at least one of a transmitted control signal and/or a parameter determined in the welding device and maintaining the output DC voltage during the stand-by phase in order to provide the welding power unit with the output DC voltage required for an optimal start of the welding phase.

2. The method according to claim 1, wherein at least one further switch element of at least one further branch of the DC-to-DC converter is switched with at least one further switching frequency, wherein in the welding phase the at least one further switching frequency corresponds to a further normal switching frequency, in order to transmit energy from the input connection to the output connection.

3. The method according to claim 2, wherein the at least one further normal switching frequency corresponds to the normal switching frequency.

4. The method according to claim 1, wherein, in the stand-by phase, the at least one further switching frequency is switched with a further stand-by switching frequency lower than the further normal switching frequency.

5. The method according to claim 4, wherein the at least one further stand-by switching frequency corresponds to the stand-by switching frequency.

6. The method according to claim 1, wherein, in the stand-by phase, the at least one switch element and/or at least one of the further switch elements is deactivated.

7. The method according to claim 1, wherein the control signal is made by actuating a switch or button at the intended start or end of the welding.

8. The method according to claim 1, wherein the parameter is given by a reduced or increased welding voltage and/or a reduced/increased current flow on the output side.

9. The method according to claim 1, wherein the transmitted control signal is transmitted via an interface.

10. A welding device comprising:

a DC-to-DC converter having an input connection and an output connection, the DC-to-DC converter being configured to convert an input DC voltage present at the input connection into an output DC voltage present at the output connection; and a welding power unit having a power unit input and a power unit output, the output DC voltage being applied to the power unit input and the welding power unit being configured to control the output DC voltage present at the power unit input to a welding voltage present at the power unit output, the DC-to-DC converter comprises at least one switch element in a branch and a control unit, the control unit being designed to switch the at least one switch element in a welding phase with a switching frequency corresponding to a normal switching frequency, in a stand-by phase, in which no arc burns, with a switching frequency corresponding to a stand-by switching frequency that is lower than the normal switching frequency, wherein a transmitted control signal and/or a parameter defined in the welding device effects a switchover from the welding phase into the stand-by phase and/or from the stand-by phase into the welding phase, and wherein the control unit is designed to maintain the output DC voltage during the stand-by phase in order to provide the welding power unit with the output DC voltage required for an optimal start of the welding phase.

11. The welding device according to claim 10, wherein the branch comprises an inductor and a freewheeling diode, wherein a first coil terminal of the inductor is connected to the input connection and a second coil terminal of the inductor is connected to a first switch terminal of the switch element and to an anode of the freewheeling diode, wherein a second switch terminal of the switch element is connected to ground and a cathode of the freewheeling diode is connected to the output connection.

12. The welding device according to claim 11, wherein the DC-to-DC converter comprises at least one further branch having at least one further switch element, at least one further inductor and at least one further freewheeling diode, wherein, in the at least one further branch, a first coil terminal of the at least one further inductor is in each case connected to the input voltage, and a second coil terminal of the at least one further inductor is in each case connected to a first switch terminal of the at least one further switch element and in each case to an anode of the at least one further freewheeling diode, wherein a second switch terminal of the at least one further switch element is in each case connected to ground, and a cathode of the at least one freewheeling diode is in each case connected to the output connection, and wherein the control unit is designed to switch the at least one further switch element with at least one further switching frequency corresponding to a further normal switching frequency during the welding phase of the welding device.

13. The welding device according to claim 12, wherein the control unit is designed to switch the at least one further switch element with a further stand-by switching frequency lower than the further normal switching frequency, in the stand-by phase of the welding device.

14. The method according to claim 13, wherein the further stand-by switching frequency corresponds to the stand-by switching frequency.

15. The welding device according to claim 10, wherein the control unit is designed to deactivate the at least one switching element and/or at least one of the further switching elements in the stand-by phase of the welding device.

16. The method according to claim 10, wherein the transmitted control signal is transmitted via an interface.

* * * * *